United States Patent [19]
Minoura et al.

[11] 4,329,012
[45] May 11, 1982

[54] TWO-DIMENSIONAL SCANNING DEVICE

[75] Inventors: Kazuo Minoura, Yokohama; Takehiko Kiyohara, Zama; Haruo Uchiyama, Kawasaki, all of Japan

[73] Assignee: Canon Kabushiki Kaisha, Tokyo, Japan

[21] Appl. No.: 110,378

[22] Filed: Jan. 8, 1980

[30] Foreign Application Priority Data

Jan. 17, 1979 [JP] Japan .................................. 54-3036

[51] Int. Cl.³ .............................................. G02B 27/17
[52] U.S. Cl. ....................................... 350/6.8; 358/199
[58] Field of Search ........................... 350/6.8; 358/199

[56] References Cited

U.S. PATENT DOCUMENTS

| | | | |
|---|---|---|---|
| 4,050,780 | 9/1977 | Wei et al. | 350/6.91 |
| 4,133,005 | 1/1979 | Golay et al. | 358/199 |
| 4,180,307 | 12/1979 | Tateoka et al. | 350/6.5 |

*Primary Examiner*—John K. Corbin
*Assistant Examiner*—B. W. de los Reyes
*Attorney, Agent, or Firm*—Fitzpatrick, Cella, Harper & Scinto

[57] ABSTRACT

A two-dimensional scanning device constructed with first deflector to deflect a collimated beam, second deflector to deflect an incident beam in the direction orthogonally intersecting the deflecting direction of the first deflector, a scanning lens interposed between the first and second deflectors, a scanning plane to focus a scanning beam from the scanning lens through the second deflector, and an expedient to obtain a distortion-free two-dimensional scanning pattern on the scanning plane by rotating the scanning plane around a rotational axis in the direction orthogonally intersecting the deflecting direction of the second deflector in synchronism with rotation of the second deflector.

6 Claims, 2 Drawing Figures

TWO-DIMENSIONAL SCANNING DEVICE

BACKGROUND OF THE INVENTION

This invention relates to a device for writing and reading a two-dimensional scanning pattern. More particularly, it is concerned with a two-dimensional scanning device capable of obtaining a distortion-free light beam scanning image on the surface of a medium to be scanned.

This type of two-dimensional scanning device has been used in a laser beam printing apparatus which modulates the laser beam with image informations such as patterns, designs, characters, etc. from electronic computers and facsimile image transmitters, then subjects the modulated beam to a two-dimensional deflection, and produces high quality hard copies as an output at a high speed using the electrophotographic process or heat mode recording method, and others. It has also been used in an apparatus such as, for example, facsimile image transmitters, which deflects two-dimensionally an unmodulated laser beam, projects the thus deflected laser beam onto a two-dimensional pattern, and subjects light reflected from the pattern to photo-electric conversion to thereby obtain two-dimensional image informations. In the heretofore known two-dimensional scanning device, the scanning operation is performed on the scanning surface accompanying distortion. Correction of such distorted scanning pattern has been done electrically by the use of corrective operational circuits such as a position detector and a large-capacity memory device. Such electrical signal processing means, however, should unavoidably take a complicated construction.

SUMMARY OF THE INVENTION

In view of the above-described disadvantages in the known types of two-dimensional scanning device, it is the primary object of the present invention to provide an improved two-dimensional device which is so suitably constructed that undesirable distortion in the two-dimensional scanning may be eliminated by the use of optical as well as mechanical expedients without use of the electrical signal processing device as in the known device.

It is the secondary object of the present invention to provide an improved two-dimensional scanning device which moves at an equal speed in each scanning direction when a light beam spot scanning on a flat scanning surface moves in the two-dimensional directions, i.e., the principal scanning direction and the auxiliary scanning direction.

According to the present invention, generally speaking, there is provided a two-dimensional scanning device having a first deflector, a second deflector to perform deflection of light beam within a plane which orthogonally intersects the deflecting and scanning plane of the light beam to be deflected by the first deflector, an image forming optical system interposed between the first and second deflectors and to converge the scanning light beam on the flat surface of the scanning plane, and mechanical means to rotate the scanning plane around a rotational axis in the direction orthogonally intersecting the deflecting and scanning surface of the light beam to be deflected by the second deflector in synchronism with the deflecting action of the second deflector.

The rotational axis should, preferably, exist at the center part of the scanning surface relative to the auxiliary scanning direction, and rotates at an equal angle to the rotational angle of the abovementioned second deflector.

Further, the two-dimensional scanning device according to the present invention renders constant the speed of the light beam in the principal scanning direction on the scanning surface by appropriate selection of the image forming characteristic, i.e., distortional characteristics, of the abovementioned image forming optical system in accordance with the deflecting characteristics of the deflector which governs the principal scanning of the light beam on the scanning surface.

Furthermore, the scanning device according to the present invention renders constant the speed of the light beam relative to the auxiliary scanning direction on the image scanning plane by taking the deflecting characteristics of the second deflector, i.e., the rotational speed of the deflecting and reflecting surface of the second deflector at a predetermined value. The term "principal scanning" as herein used is meant by the scanning for producing scanning lines on the scanning plane, and the term "auxiliary scanning" is meant by the scanning in the direction orthogonally intersecting with the principal scanning lines. Accordingly, the deflector for the principal scanning scans the light beam at a high speed, and performs the deflecting actions in multiple numbers of times, while it is scanning the scanning surface once. In contrast to this, the scanning for the auxiliary scanning performs a single deflecting action at most, during its one scan on the scanning surface.

DETAILED DESCRIPTION OF PREFERRED EMBODIMENT

Figure 1:
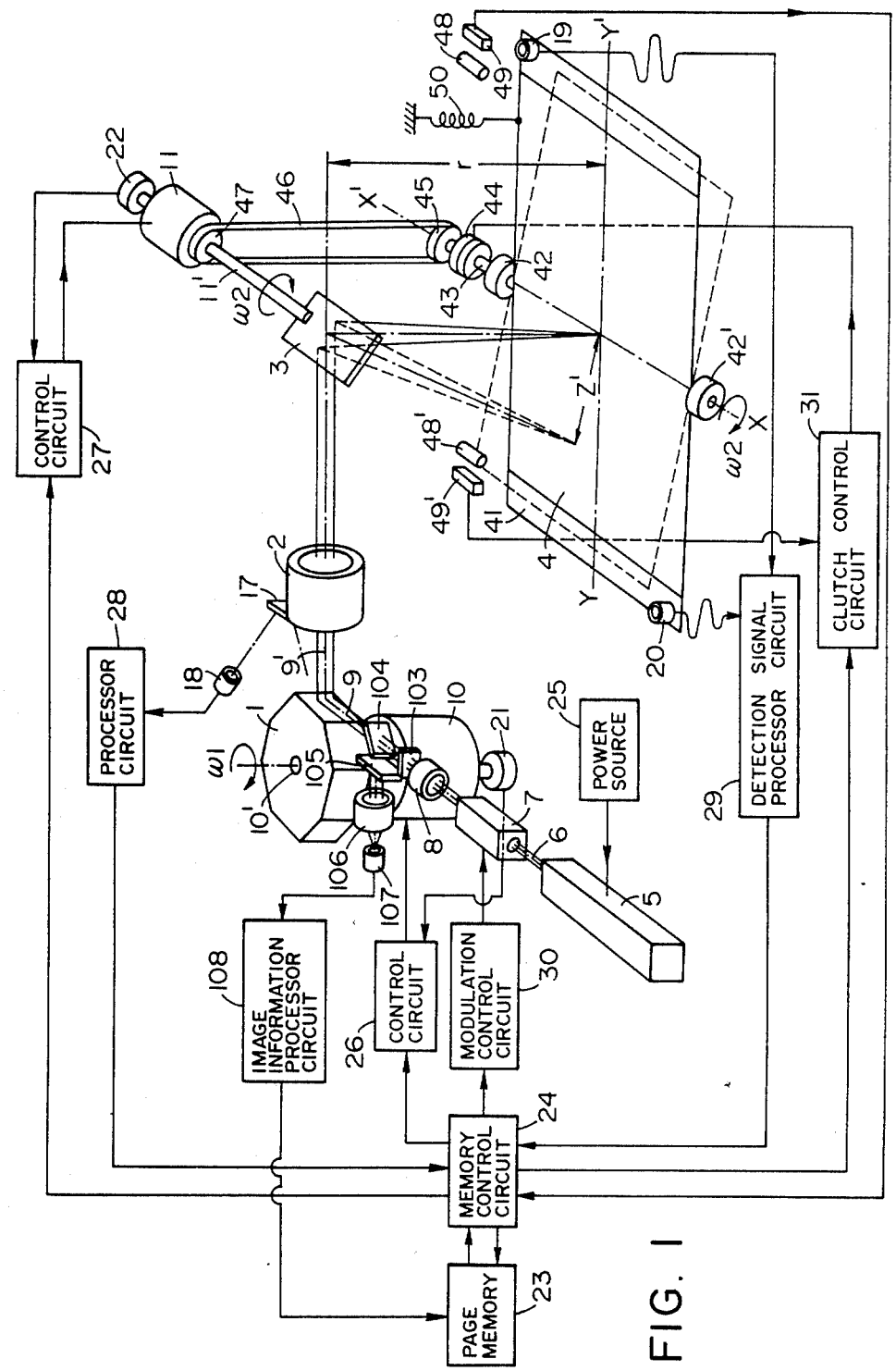
FIG. 1 is a schematic diagram showing one embodiment of the two-dimensional scanning device according to the present invention.

In the following, one embodiment of the two-dimensional scanning device according to the present invention will be described in reference to FIG. 1. In the drawing, a reference numeral 1 designates a rotatory polygonal (or polyhedral) mirror constituting the first deflecting means, a numeral 2 refers to an image-forming scanning lens, 3 a rotatory mirror constituting the second deflecting means, 4 a medium to be scanned (or a recording medium surface), and 5 a laser oscillator. Light beam 6 projected from the laser oscillator 5 is modulated by a light modulator 7 depending on necessity, and further expanded its beam diameter by a beam expander lens 8, whereby a collimated beam is taken out. This collimated beam is introduced into the rotatory polygonal mirror 1 through a polarizing plane 103 and a semi-transparent mirror 104. Incidentally, the rotatory polygonal mirror 1 is fixedly provided on a rotational shaft 10' of a drive motor 10, and deflects the incident collimated beam 9 by the rotation of the drive motor 10 to thereby emit deflected beam 9'. This deflected beam 9' is projected into the scanning lens 2, through which the deflected beam 9' is constantly focussed on the recording medium surface 4 by way of the rotatory mirror 3.

The image-forming scanning lens 2 has a distortional characteristic corresponding to the rotational characteristic of the rotary polygonal mirror 1 constituting the first deflecting means. The distortional characteristic can be generally represented as follows:

$$y' = F(\omega_1) \tag{1}$$

(where $\omega_1$ is a rotational angle of the rotary polygonal mirror 1. $y'$ denotes a scanning position in the direction of X-X' on the recording medium surface).

The scanning speed on the recording medium surface (scanning medium) 4 is obtained by differentiating the above equation (1) with a time t, as follows:

$$dy'/dt = dF/d\omega_1 \cdot d\omega_1/dt \tag{2}$$

If it is assumed that the left side of the above equation (2) is equal to a constant k in view of the scanning speed being constant, the following equation (3) is derived from the equation (2):

$$dF/d\omega_1 = K/(d\omega_1/dt) \tag{3}$$

By integrating the above equation (3), the distortional characteristic function F of the scanning lens can be represented as follows:

$$F = \int [k/(d\omega_1/dt)] \cdot d\omega_1 \tag{4}$$

In other words, by establishing the rotational characteristic $d\omega_1/dt$ of the rotary polygonal mirror 1, the distortional characteristic of the scanning lens 2 can be obtained from the equation (4). Incidentally, the manner of setting the coordinate on the scanning medium 4 is such that the center for the two-dimensional scanning of the scanning medium is taken on the original point, the X-X' axis is in the direction of the principal scanning, and the Y-Y' axis in the direction of the auxiliary scanning.

When the equi-angular speed rotary polygonal mirror 1 is used as the first deflecting means, and the scanning lens 2 having its distortional characteristic of $y' = f \cdot \omega_1$ at the focal length f is used, the scanning speed in the deflecting direction X-X' by the first deflecting means on the scanning medium 4 becomes constant by virtue of the following equation (5):

$$dy'/dt = f \cdot d\omega_1/dt = f \cdot k_1 = \text{constant} \tag{5}$$

($k_1$ = constant)

Since the rotary mirror 3, constituting the second deflecting means, is fixed on the rotational shaft 11' of the drive motor 11, the incident light beam onto the rotary mirror 3 with rotation of the drive motor 11 performs the two-dimensional scanning in the Y-Y' direction on the scanning medium 4.

Further, in FIG. 1, the scanning medium 4 is mounted on a rotary plate 41. The center part of the rotary plate 41 in its Y-Y' direction is coupled, through bearings 42, 42', with a shaft 43 which rotates around the center of these bearings. The shaft 43 can be coaxially connected with a pulley 45 through an electromagnetic clutch 44, and the pulley 45 is coupled with a pulley 47 through a synchronous belt 46. The pulley 47 is coaxially disposed on the rotational axis 11' of the motor 11. Accordingly, the rotation of the drive motor 11 is transmitted to the shaft 43 through the pulley 47, the belt 46, the pulley 45, and the clutch 44, whereby the scanning plane of the scanning medium 4 which is coaxially disposed with the shaft 43 rotates in synchronism with rotation of the drive motor 11. Reference numerals 48, 48' designate stopper pins to control the rotating range of the rotary plate 41, and 49, 49' refer to stop position detectors which are disposed in the vicinity of the stopper pins 48, 48' and detect the stopped position of the rotary plate 41 to emit a stop position signal. A return spring 50 is a bias spring which energizes the rotary plate 41 for its return rotation in a predetermined direction.

The scanning speed of the beam by the second deflector 3 in its auxiliary scanning direction on the surface of the scanning medium 4 can be made constant by rotating the deflector in such a manner that its rotational angle $\omega_2$ follows the following relationship with respect to a time t:

$$\omega_2 = \sin^{-1} k_2/2r \cdot t \tag{6}$$

($k_2$ = constant)

wherein a distance from a point where the optical axis intersects with the rotary mirror 3 constituting the second deflector 3 to the rotational center of the shaft 43 is taken r, and the rotation of the motor 11 and the rotation of the shaft 43 are perfectly synchronized with rotations of the rotary mirror 3 and the scanning medium 4 through coupling of the pulleys 45, 47 and the synchronous belt 46. In other words, the scanning position Z' of the light beam in the Y-Y' direction on the surface of the scanning medium 4 by the second deflector 3 with respect to the rotational angle $\omega_2$ of the second deflector 3 is expressed by the following equation (7):

$$Z' = 2r \sin \omega_2 \tag{7}$$

By substituting the equation (6) for the equation (7), the following relationship is established:

$$Z' = k_2 \cdot t \tag{8}$$

As seen from the above equation (8), the scanning position Z' is proportionate to the time t and the scanning speed becomes constant.

Again, in FIG. 1, a numeral 17 refers to a reflecting mirror which receives and reflects those deflected beams not containing the image informations out of the deflected beams projected from the first deflecting means, i.e., the rotary polygonal mirror 1. A numeral 18 refers to a light detecting element which receives the deflected beam from the reflecting mirror 17, and supplies a light detecting signal therefrom to a light detection signal processing circuit 28 where an information discharging signal for each line scanning is generated, which, in turn, is supplied to a memory control circuit 24. A reference numeral 19 designates a light detection element which is provided on the rotary plate 41 and functions to project the deflected beam initially scanned by the second deflecting means 3 to generate a modulation start reference signal. A numeral 20 also designates a light detection element which is provided on the rotary plate 41 and functions to project the deflected beam finally scanned by the second deflecting means 3 to generate a scanning end reference signal.

A reference numeral 21 designates a rotational position signal generator provided on the rotational shaft 10' of the drive motor 10, for which there may be used optical encoders, magnetic induction type encoders, electric resistance type potentiometers, and capacitance type potentiometers, etc.. The first deflecting position signal from the rotational position signal generator 21 is supplied to a first deflector control circuit 26. This control circuit 26 compares a reference clock within the circuit and the first deflecting position signal, and, if there is a difference between them, sends out a corrective signal to the drive motor 10 to control the same to rotate at a certain definite angular speed. A reference numeral 22 designates a rotational position signal generator provided on the rotational shaft 11' of the motor 11 which drives the rotary mirror 3. The second deflecting position signal from this rotational position signal generator 22 is added to a second deflector control circuit 27. The control circuit 27 compares a reference drive waveform within the circuit and the second deflecting position signal, and, if there is a difference between them, sends out a corrective signal to the motor 11 so that it may rotate with a certain definite characteristic.

A numeral 23 refers to a page memory, in which image information data such as patterns and characters from electronic computers and facsimile image transmitters are accumulated. The beam detecting signal generated from the light detector 19, into which the beam projected from the abovementioned second deflecting means 3 enters, is processed by a light detection signal processing circuit 29, and, after lapse of a certain definite time, an effective scanning start signal is introduced as an input into the memory control circuit 24 with respect to the page memory 23. This memory control circuit 24 dictates the page memory 23 to discharge the data in synchronism with the effective scanning start signal. Further, in the memory control circuit 24, the data in the page memory 23 are sequentially read out bit by bit for one scan line with the information discharging signal from the light detecting signal processing circuit 28 as a trigger signal, and then added to a modulation control circuit 30. While a beam from one of the reflecting surfaces of the first deflecting means 1 is scanning the scanning medium 4 in the X-X' direction, the data for one scan line which are stored in the page memory 23 are added to the modulator 7 from the modulation control circuit 30, whereby bright and dark patterns of one scan line is imparted to the laser beam 6.

While the first deflecting means 1 is scanning one scan line, an electro-magnetic clutch 44 is turned on by a signal from the memory control circuit 24 through an electro-magnetic clutch control circuit 31, whereby the second deflecting means 3 shifts the beam in the auxiliary scanning direction for an appropriate scan line interval. When the two-dimensional scanning of the scanning beam on the scanning medium surface 4 comes close to an end, the light detector 20 receives the scanning beam and generates an effective scanning end signal, which is processed by the light detecting signal processing circuit 29, and a data discharging mode stop signal is introduced as an input into the memory control circuit 24, whereby the page memory 23 stops the data discharging mode.

A proximity signal of the rotary plate 41 to be taken out of the stop position detector 49' is added to the electro-magnetic clutch control circuit 31, whereby the control signal to be obtained from this electro-magnetic clutch control circuit 31 is added to the electro-magnetic clutch 44 to disconnect it. As the consequence, the coupling between the shaft 43 and the motor 11 is disconnected, and the shaft 43 is no longer driven by the motor 11, whereby the rotary plate 41 reversely rotates to the position of the stopper pin 48 by the return spring 50. Here, the stop position detector 49 detects the abovementioned return of the rotary plate 41, and adds the detected output to the second deflector control circuit 27 through the memory control circuit 24 to emit an instruction for resetting the initial position, whereby the abovementioned second deflecting means 3 returns to the initial position to stop its operation. Incidentally, a reference numeral 25 designates a power source for driving the laser oscillator 5.

Furthermore, in FIG. 1, the following construction is adopted to perform reading of the original by placing the original to be read at the position of the scanning medium 4. That is, when the device according to this embodiment is changed over to an original reading mode, the modulator 7 performs a constant level operation by the modulation control circuit 30. Accordingly, the laser beam 6 projected from the laser oscillator 5 is not modulated, but it projects from the modulator to enter into the beam expander lens 8. The light beam projected from the beam expander lens 8 is polarized by the polarizer 103, and further enters into the first deflector 1 through the semi-transparent mirror 104. Moreover, the light beam projected from the first deflector 1 performs the two-dimensional scanning of the original surface placed at the position of the scanning medium 4 by the scanning lens 2 and the second deflector 3. The reflected light from the original surface passes through an opposite light path in the scanning optical system, and bent by the semi-transparent mirror 104, and enters a polarizing plate 105. Since the deflecting direction of the polarizing plate 105 is displaced by 90° with respect to the deflecting direction of the polarizing plate 103, the original surface reflected light to be emitted from the polarizing plate 105 is separated from the light beam projected from the polarizing plate 103, whereby it has a reflection intensity based on the image informations on the original surface. The original surface reflected light to be projected from the polarizing plate 105 is introduced into the light detector 107 through an imageforming lens 106 to generate an image information signal. This image information signal is added to the image information processing circuit 108, wherein the image information signal is subjected to appropriate coding treatment in synchronism with the deflector control signal from the first deflector control circuit 26, followed by sending the coded signal into the page memory 23.

In the following, another embodiment of the present invention will be explained in reference to FIG. 2. In this embodiment, those parts which are same as those in FIG. 1 are designated by the same reference numerals, and the relevant explanations thereof are dispensed with. The laser beam 6 oscillated from the laser oscillator 5 is modulated by the modulator 7 depending on necessity, and then its beam diameter is expanded by the beam expander lens 8 with simultaneous collimation thereof.

The beam 6 which has exited from the beam expander lens 8 passes through the polarizing plate 103 and the semi-transparent mirror 104, and enters into a vibratory mirror 101 constituting the first deflecting means. This vibratory mirror 101 is fixed to a rotational shaft 102' of an oscillatory motor 102, and deflects the incident beam in accordance with oscillation of the motor 102 to project the deflected beam 9'. This deflected beam 9' is constantly focussed on the scanning medium surface 4 by the scanning lens 2.

Here, the scanning lens 2 has a distortional characteristic corresponding to the oscillating characteristic of the vibratory mirror 101 constituting the first deflecting means. Now, if a sinusoidally vibrating mirror having an amplitude $\phi_0$ is used as the first deflecting means 101, and the scanning lens 2 having a focal length f and the distortional characteristic of $$y' = 2\phi_0 f \sin^{-1} \omega_3/\phi_0 \qquad (9)$$

(where: y' denotes a position of light beam on the scanning medium 4 in the X-X' direction relative to the angle of rotation $\omega_3$ of the first deflecting means) is used, the scanning speed in the X-X' deflecting direction by the first deflecting means 101 becomes constant. In more detail, the angle of rotation $\omega_3$ of the first deflector 101 is represented as follows:

$$\omega_3 = \phi_0 \sin k_3 \cdot t \qquad (10)$$

($k_3$ = constant).

Substituting the equation (9) for the equation (10), the following equation (11) is derived:

$$y' = 2\phi_0 f k_3 \cdot t \qquad (11)$$

As seen from the equation (11), the scanning position y' is proportionate to the time t, and the scanning speed becomes constant. Since the rotary mirror 3 constituting the second deflecting means is fixed onto the rotational shaft 11' of the drive motor 11 same as the previous embodiment, the beam entering the rotary mirror 3 with rotation of the drive motor 11 is two-dimensionally scanned in the Y-Y' direction on the scanning medium 4.

Figure 2:
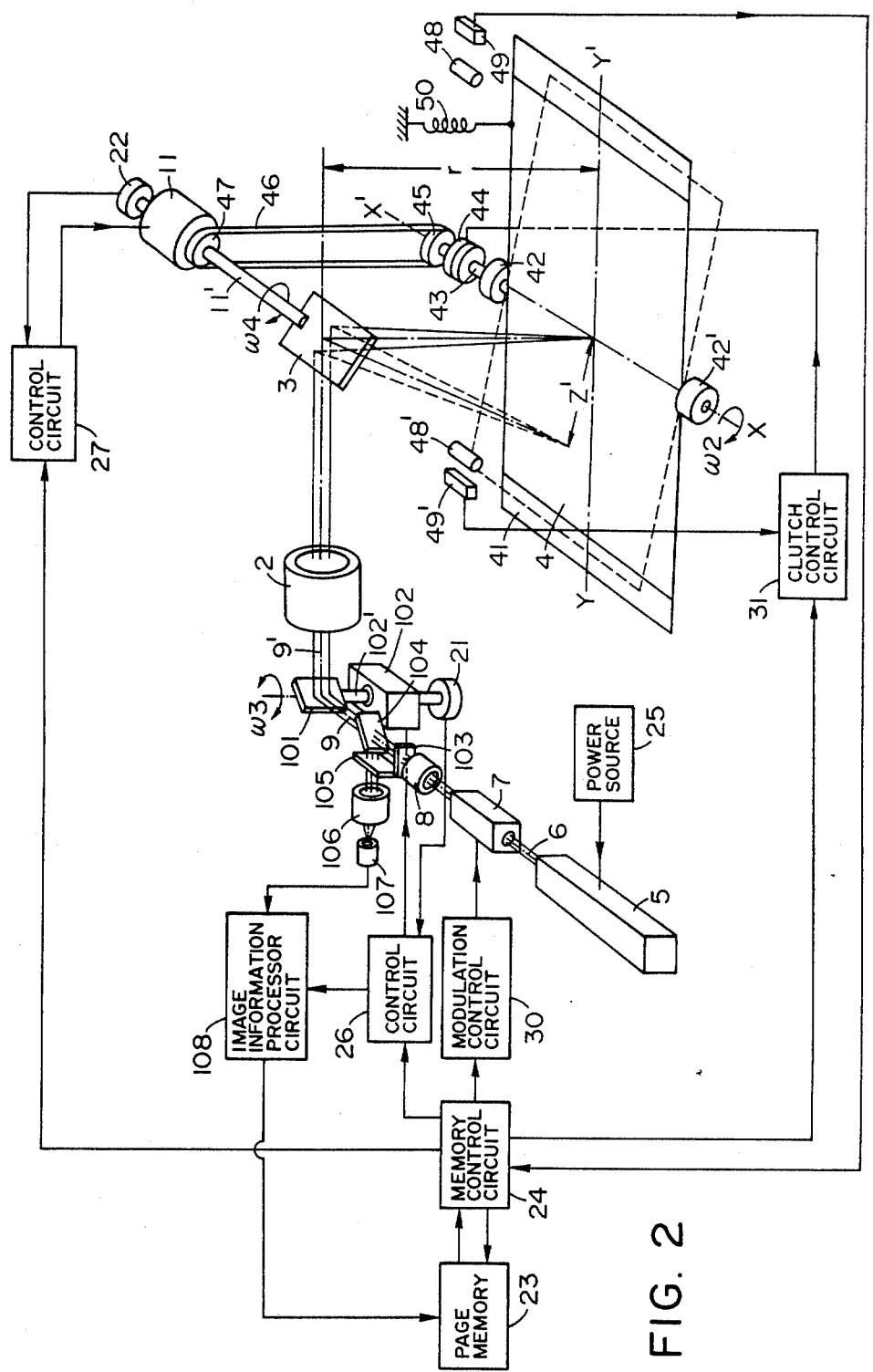
FIG. 2 is also a schematic diagram showing another embodiment of the two-dimensional scanning device according to the present invention.

Further, in FIG. 2, the scanning medium 4 is mounted on the rotary plate 41. The center part of the rotary plate 41 in the Y-Y' direction is coupled, through bearings 42, 42', with the shaft 43 which rotates at the center of these bearings. This shaft 43 can be coaxially connected with the pulley 45 through the electromagnetic clutch 44. The pulley 45 is coupled with the pulley 47 through the synchronous belt 46. The pulley 47 is coaxially disposed on the rotational shaft 11' of the motor 11. Accordingly, the rotation of the motor 11 is transmitted to the shaft 43 through the pulley 47, the belt 46, the pulley 45, and the clutch 44, whereby the scanning surface of the scanning medium 4 coaxially disposed with the shaft 43 also rotates in synchronism with rotation of the motor 11. Reference numerals 48, 48' designate stopper pins for limiting the rotating range of the rotary plate 41. 49, 49' refer to stop position detectors which are disposed in the vicinity of the stopper pins 48, 48' and detect the stop position of the rotary plate 41 to generate a stop position signal. A return spring 50 is a bias spring which energizes the rotary plate 41 for its return rotation in a predetermined direction. The scanning speed of the beam in its auxiliary scanning direction on the surface of the scanning medium 4 by the second deflector 3 can be made constant by rotating the deflector in such a manner that its angle of rotation $\omega_2$ follows the following relationship with respect to a time t:

$$\omega_2 = \sin^{-1} k_2/2r \cdot t \qquad (12)$$

($k_2$ = constant).

wherein a distance from a point where the optical axis intersects with the rotatory mirror 3 constituting the second deflector to the rotational center of the shaft 43 is taken r, and the rotation of the motor 11 and the rotation of the shaft 43 are perfectly synchronized with rotations of the rotatory mirror 3 and the scanning medium 4 through coupling of the pulleys 45, 47 and the synchronous belt 46. In other words, the scanning position Z' of the light beam in the Y-Y' direction by the second deflector 3 on the surface of the scanning medium 4 is expressed by the following equation (13)

$$Z' = 2r \sin \omega_2 \qquad (13).$$

By substituting the equation (12) for the equation (13), the following relationship is established.

$$Z' = k_2 \cdot t \qquad (14).$$

As seen from the above equation (14), the scanning position Z' is proportionate to the time t, and its speed becomes constant.

The first deflector control circuit section 26, into which the first deflecting position signal from the rotational position signal generator 21 provided on the drive shaft 102' of the drive motor 102 for the first deflector 101, has been introduced as an input, determines the deflecting frequency and amplitude of the deflector 101 by comparing and controlling the driving wave pulses within the circuit 26 and the abovementioned first deflecting position signal.

The abovementioned first deflecting position signal is also used as the information discharging signal for every line scanning in the afore-described embodiment.

The second deflector control circuit 27, into which the second deflecting position signal from the rotational position signal generator 22 provided on the rotational shaft 11' of the motor 11 to drive the rotatory mirror 3 has been introduced as an input, compares a reference drive wave form within the circuit 27 with the second deflecting position signal, and, if there is a difference between them, sends out a corrective signal to the motor 11 to control it to rotate with a constant rotational characteristic. Also, the second deflecting position signal generated from the rotational position signal generator 22 is also used as the effective scanning start signal and the effective scanning end signal as mentioned in the previous embodiment.

In the following, explanations will be given as to the original reading function by placing the original at the position of the scanning medium 4.

When the device of this second embodiment is changed over to its original reading mode, the modulator 7 performs a constant level operation by the modulation control circuit 30. Accordingly, the laser beam 6 oscillating from the laser oscillator 5 emits from the modulator 7 without being modulated and enters into the beam expander lens 8. The laser beam projected from the beam expander lens 8 is polarized by the polarizer 103, and further passes through the semi-transparent mirror 104 to enter the first deflector 101. The beam projected from the first deflector 101 performs the two-dimensional scanning of the original surface placed at the position of the scanning medium 4 by the scanning lens 2 and the second deflector 3. The reflected light from the original surface passes through an opposite light path in the abovementioned scanning optical system and bent by the semi-transparent mirror 104, and enters into the polarizing plate 105. The polarizing direction of the polarizing plate 105 is displaced by 90° with respect to the polarizing direction of the polarizing plate 103, so that the original surface reflected light projected from the polarizing plate 105 is separated from the beam projected from the polarizing plate 103, and has the reflection intensity based on the image information of the original surface. The original surface reflecting light projecting from the polarizing plate 105 is caused to enter into the light detector 107 through the image forming lens 106 to generate an image information signal. This image information signal is added to the image information processing circuit 108 where the image information signal is subjected to appropriate coding treatment in synchronism with the deflector control signal of the first deflector control circuit 26, after which it is sent into the abovementioned page memory 23.

What we claim:

1. A two-dimensional scanning device, comprising:
   (a) first deflecting means to perform the principal scanning on the surface to be scanned;
   (b) second deflecting means to deflect a light beam within a plane which orthogonally intersects with a deflecting plane of the light beam to be deflected by said first deflecting means, and to perform the auxiliary scanning in the direction orthogonally intersecting the direction of said principal scanning on the scanning surface;
   (c) an image forming optical system interposed between said first and second deflecting means; and
   (d) mechanical means to rotate said scanning surface around a rotational axis extending in the direction orthogonally intersecting the scanning line by the operation of said second deflecting means on said scanning surface and to rotate said scanning surface in accordance with the deflecting action of said second deflecting means so that one of the focal positions of said image forming optical system is constantly present on the scanning surface.

2. The two dimensional scanning device as set forth in claim 1, wherein said rotational axis exists at the center part of the scanning surface with respect to said auxiliary scanning direction, and the angle of rotation of the rotational axis is equal to the angle of rotation of the deflecting and reflecting surface of the second deflecting means.

3. The two dimensional scanning device as set forth in claim 2, wherein the angle of rotation $\omega_2$ of said second deflecting means is expressed in the following relationship:

$$\omega_2 = \sin^{-1}(k_2/2r \cdot t)$$

(where: r denotes a distance between the deflecting and reflecting surface of the second deflecting means and the rotational axis of the scanning surface; t represents a time; and $k_2$ is a constant).

4. The two dimensional scanning device as set forth in claim 1, wherein said first deflecting means is a rotatory polygonal mirror which rotates at an equi-angular speed, and said image forming optical system has the image forming characteristics represented as $y' = f \cdot \omega_1$ (where: f denotes a focal length of the image forming optical system, $\omega_1$ represents an angle or rotation of the rotatory polygonal mirror, and $y'$ expresses a scanning position in the direction of the principal scanning on the scanning surface).

5. The two dimensional scanning device as set forth in claim 1, wherein said first deflecting means is a reflecting mirror which performs sinusoidal vibrations with an amplitude of $\phi_0$ and rotates at an angle of rotation $\omega_3$ of $\phi_0 \cdot \sin k_3 \cdot t$ with respect to a time t, (where $k_3$ is a constant) and said image forming optical system has the image forming characteristics such that its scanning position $y'$ of the principal scanning direction is represented as follows: $y' = 2\phi_0 \cdot f \cdot \sin^{-1} \omega_3/\phi_0$ (where: f represents a focal length of said image forming optical system).

6. The two dimensional scanning device comprising:
   (a) a light source section to supply a collimated light beam;
   (b) a first deflector to deflect said light beam in a predetermined direction;
   (c) a second deflector to deflect the light beam within a plane perpendicular to the deflecting and scanning surface of the light beam to be deflected by said first deflector;
   (d) a scanning surface to be subjected to two-dimensional scanning by the light beam from the second deflector;
   (e) an image forming optical system interposed between said first and second deflectors and to condense the light beam on said scanning surface; and
   (f) mechanical means which rotates said scanning surface around the rotational axis which extends in the direction orthogonally intersecting the scanning line on said scanning surface by said second deflector in accordance with the deflecting action of said second deflector.

* * * * *